(12) United States Patent
Tillotson

(10) Patent No.: US 8,668,472 B2
(45) Date of Patent: Mar. 11, 2014

(54) WAVE ACTUATED PUMP AND MEANS OF CONNECTING SAME TO THE SEABED

(76) Inventor: Robert Tillotson, Pillaton (GB)

( * ) Notice: Subject to any disclaimer, the term of this patent is extended or adjusted under 35 U.S.C. 154(b) by 508 days.

(21) Appl. No.: 13/002,317

(22) PCT Filed: Jul. 10, 2009

(86) PCT No.: PCT/GB2009/001718
§ 371 (c)(1),
(2), (4) Date: Dec. 31, 2010

(87) PCT Pub. No.: WO2010/004293
PCT Pub. Date: Jan. 14, 2010

(65) Prior Publication Data
US 2011/0097220 A1    Apr. 28, 2011

(30) Foreign Application Priority Data

Jul. 11, 2008 (GB) ................................ 0812739.1

(51) Int. Cl.
*F04B 17/00* (2006.01)
*F04B 35/00* (2006.01)
(52) U.S. Cl.
USPC .......................................... 417/332; 417/330
(58) Field of Classification Search
USPC ................. 417/330, 332, 333, 335, 545, 554, 417/555.1; 91/422; 60/398
See application file for complete search history.

(56) References Cited

U.S. PATENT DOCUMENTS

| | | | | | |
|---|---|---|---|---|---|
| 2,605,712 | A | * | 8/1952 | Davis et al. ................... | 166/54.1 |
| 2,901,980 | A | * | 9/1959 | Jordan ........................... | 417/495 |
| 3,078,804 | A | * | 2/1963 | Mecusker et al. ............. | 417/404 |
| 4,076,463 | A | * | 2/1978 | Welczer ......................... | 417/331 |
| 4,326,840 | A | * | 4/1982 | Hicks et al. .................... | 417/331 |
| 4,382,716 | A | * | 5/1983 | Miller ............................. | 405/60 |
| 4,619,762 | A | * | 10/1986 | Delacour et al. .......... | 210/170.11 |
| 5,179,837 | A | * | 1/1993 | Sieber ............................. | 60/500 |
| 5,394,695 | A | * | 3/1995 | Sieber ............................. | 60/398 |
| 5,842,838 | A | * | 12/1998 | Berg ............................... | 417/331 |
| 6,392,314 | B1 | * | 5/2002 | Dick ................................ | 290/53 |
| 2007/0126239 | A1 | * | 6/2007 | Stewart et al. .................. | 290/53 |
| 2010/0102562 | A1 | * | 4/2010 | Greenspan et al. ............. | 290/53 |
| 2010/0219065 | A1 | * | 9/2010 | Burns ......................... | 204/230.3 |
| 2011/0081259 | A1 | * | 4/2011 | Vowles ........................ | 417/331 |

* cited by examiner

*Primary Examiner* — Devon Kramer
*Assistant Examiner* — Lilya Pekarskaya
(74) *Attorney, Agent, or Firm* — David A. Guerra

(57) ABSTRACT

A pumping apparatus for harvesting the wave energy and converting such energy into hydraulic power which may be transmitted and used to generate electricity or to produce desalinated water. The pumping apparatus has a float, an accumulator pressurized above the ambient pressure of the pump, the accumulator is charged with fluid and the pump is full of fluid. A check valve is closed and a pumping chamber is pressurized. An additional pumping chamber is also equally pressurized. An axial force is generated on a first tube by the pressure difference between its ends. An opposite axial force is generated on a second tube by the pressure difference between its ends. The second tube is larger in diameter than the first tube and hence the magnitude of the force on the second tube is greater. The resultant of these forces is balanced by a portion of the buoyancy of float.

20 Claims, 3 Drawing Sheets

US 8,668,472 B2

WAVE ACTUATED PUMP AND MEANS OF CONNECTING SAME TO THE SEABED

CROSS-REFERENCE TO RELATED APPLICATIONS

This application is an U.S. national phase application under 35 U.S.C. §371 based upon co-pending International Application No. PCT/GB2009/001718 filed on Jul. 10, 2009. Additionally, this U.S. national phase application claims the benefit of priority of co-pending International Application No. PCT/GB2009/001718 filed on Jul. 10, 2009, and Great Britain Application No. 0812739.1 filed on Jul. 11, 2008. The entire disclosures of the prior applications are incorporated herein by reference. The international application was published on Jan. 14, 2010 under Publication No. WO2010/004293.

BACKGROUND

1. Field of the Invention

The present invention relates to a method and apparatus for generating energy from the motion of waves in a body of water, such as seas, oceans and lakes.

The purpose of this invention is to enable the harvesting of renewable wave energy from the oceans and lakes of the world.

2. Description of the Prior Art

Many devices have been proposed in the past to accomplish this purpose. Very few have become commercialized because of one or more of the following reasons;

1/The device is too expensive to produce and hence unable to compete with conventional fossil fuel means of energy production.

2/Many of the devices are of high complexity. Components such as springs, running rigging, pulleys, bearings, gearboxes and other rotating equipment, electrical or electronic controls, all have limited service lives, especially in a marine environment.

3/Many of the devices attempt to generate electricity at sea and then to transmit it ashore. Water, especially sea water and electricity, like water and oil, do not mix. Any attempt at doing this will result in high construction costs and long term unreliability due to faults and corrosion problems.

4/Many devices are unable to withstand storms and high waves.

5/Many devices have not taken into account the long term serviceability and maintenance requirements which are necessary to achieve a life expectancy of at least 20 years, which is the industry norm.

6/Many devices require the use of oils, heavy metals and other materials which, if released, can be potentially damaging to the environment.

Accordingly, there is a need for an improved system and method for generating energy from waves in bodies of water that addresses some or all of the above problems.

The prior art describing devices for the capture of sea wave energy is extensive. Prior art which is closely related to the this proposed device is however limited to a few examples. The most relevant are as follows;

WINDLE, EP 0265594 discloses a float operated reciprocating pump which relies upon springs, or weights or floats with or without ropes and pulleys to actuate the return stroke. Windle also discloses the various configurations of mounting a reciprocating pump with respect to the float and foundation. The pump may be inverted, may be mounted within the float or within the sea bed or in other configurations.

JANODY, FR 2800423 also discloses a spring to actuate the return stroke.

BURNS, CA 2619100 discloses a pump utilizing a hollow piston but only proposes using gravity to actuate the return stroke.

ONO, U.S. Pat. No. 4,398,095 discloses a hydraulic method of actuating the return stroke by utilizing the pressure difference between air at the surface and the pressure of the water at depth.

WOOD, GB 2 428 747 discloses a wave energy system with a float moored to a single hydraulic cylinder.

Similarly, HICKS et al., U.S. Pat. No. 4,326,840 discloses a wave driven pump having a float moored to a hydraulic cylinder at the seabed. A wave powered pumping apparatus and method are also disclosed by WINDLE, U.S. Pat. No. 4,883,411.

Wave energy systems are also disclosed by MYUNG, GB 2281943 and SMITH, GB 2445951.

SUMMARY OF INVENTION

The intention of the present invention is that a wave actuated pump would be deployed either singly or preferably in groups or arrays of multiple pumping units. The discharge pipe of each of these pumps would be connected to a system of underwater discharge pipes which would thence be connected to the shore to deliver pressurized water for any purpose but preferably for the purpose of electricity generation or the desalination of sea water. This method of power transmission is well known, an example is the London Hydraulic Power company which in 1890 installed a system of pressurized water pipes in London, England for the purpose of transmitting power from various pumping stations to factories and other users. The generation of electricity and or production of desalinated water from hydraulic power is well understood by those knowledgeable in the art.

This invention is a reciprocating pump device, connected to the sea bed, which is operated by the upward force created by the buoyancy of a float which follows a rising wave on the water surface which causes fluid to be expelled from the pump into a discharge pipe. A portion of this pumped fluid is stored in a pressure accumulator connected to the discharge pipe or pipes. As the wave descends, a small amount of the pressurized fluid in the discharge pipe returns to the pump to activate its return stroke and also to maintain a downward force on the float so that it will tend to retain its position vertically above the point of connection on the sea bed.

According to a first aspect of the present invention, there is provided a float operated reciprocating pump comprising:

a float;

a closed cylinder connected to one of the float or the seabed and having a fluid inlet and a fluid discharge;

a piston disposed within the cylinder and moveable longitudinally therein, the piston having a passage extending longitudinally therethrough;

a fluid check valve disposed to communicate with the passage through the piston;

a first rod or tube connected to the piston and extending through one end of the closed cylinder and further connected to other of the float or the seabed;

a second rod or tube having a larger diameter than the diameter of the first rod or tube extending through the other end of the closed cylinder.

In one embodiment, the present invention provides a float operated reciprocating pumping device, comprising a float operably connected to one end of a rod or tube disposed slidably and sealably through one end of a closed cylinder, the other end of said rod or tube connected to one end of a piston disposed slidably and sealably within said cylinder, said piston having a passage between its ends and a check valve disposed to communicate with said passage, the other end of said piston connected to a second larger diameter rod or tube disposed slidably and sealably through the other end of said cylinder, said cylinder fitted with inlet means and a discharge pipe, said cylinder operably connected to the sea bed.

In an alternative embodiment, the present invention provides a float operated reciprocating pumping device as hereinbefore described, except that the float is operably connected to the cylinder and the first rod or tube is operably connected to the sea bed.

In use, the float of the pump is disposed to be acted upon by the waves in the body of water. The apparatus may be used in any body of water in which waves are propagating, including seas, lakes, oceans, rivers, estuaries or the like. References herein to 'sea' and 'seabed' are not limiting and are understood to be references to all other such bodies of water.

The second rod of tube is most preferably a tube, providing a conduit for fluid to entering and leave the cylinder therethrough.

In one preferred embodiment, the inlet of the cylinder is provided with a check valve mounted to communicate between the exterior and interior of said cylinder. The check valve may be in any suitable position in the wall of the cylinder, preferably in a position adjacent to or within the cylinder end through which the second larger diameter rod or tube passes.

In one preferred embodiment, the second larger diameter rod or tube is a tube and the inlet of the cylinder comprises a check valve mounted to communicate with the interior of said tube, wherein the interior of said tube also communicates with the cylinder via a port in the wall of said tube. Preferably, port is positioned adjacent to the connection of the tube with the piston.

This invention also relates to the method and means of deploying and retrieving the device.

This invention also relates to the method and means for protecting the device during storms.

This invention also relates to the geometry of the float with respect to self protection from storm damage and to the optimal capture of wave energy.

The invention herein disclosed overcomes all of the above mentioned drawbacks to previous inventions as follows;

1/The invention herein disclosed may be constructed from readily available materials and components and is easily manufactured using mass production techniques, hence its cost will be low.

2/The invention herein disclosed is of low complexity with very few moving parts.

3/The invention herein disclosed has no requirement for electrical generating equipment at sea.

4/The invention herein disclosed may be provided to have at least two means of protection from storms and high waves.

5/The invention herein disclosed is suitable for being built from generally very hard, long lasting materials to ensure an adequate working life. A method and means is also proposed for deployment and retrieval of the device so that it may be serviced or repaired when necessary.

6/The invention herein disclosed may avoid the use of materials which are known to be damaging to the environment.

BRIEF DESCRIPTION OF THE DRAWINGS

Embodiments of the present invention will now be described, by way of example only, having reference to the accompanying drawings.

I now refer you to the drawings, FIG. 1, FIG. 2 and FIG. 3

DESCRIPTION OF THE PREFERRED EMBODIMENT

Description of Pump

Figure 1:
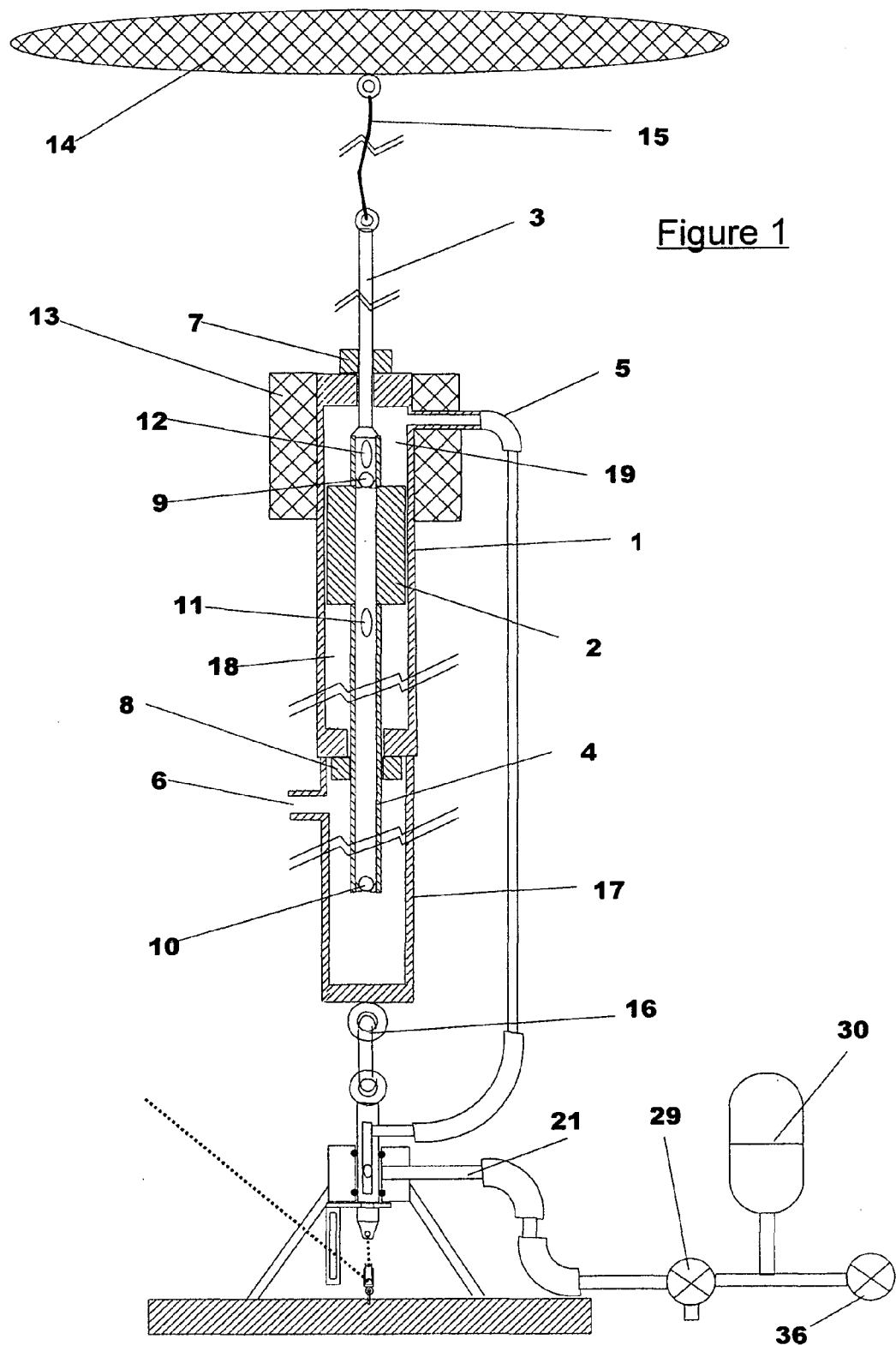
FIG. 1 is a drawing of the complete pump assembly of one embodiment of the present invention.

A float (14) which may be constructed of any buoyant material including a vessel containing or not containing a gas. The geometry of the float should be large in its horizontal dimension and relatively small in its vertical dimension. The float should have a streamlined shape in order to have minimum drag to water approaching it in the horizontal direction. There are several reasons for this shape. The large surface area will allow the float to absorb both the kinetic and the potential energy from the rising waves. The float will deliver its maximum buoyancy force with only a small rise in the wave. The streamlined shape will minimize the lateral displacement of the float caused by wave action or by prevailing currents, or when it is submerged during storms. The float described above is connected by links or clevis or toggle to a flexible rope or chain or rod or tube (15) which itself is connected in a similar manner to one end of the rod or tube (3). The other end of this rod or tube is rigidly connected to one end of the piston (2). Piston (2) is hollow to allow the passage of fluid to check valve (9) which is mounted within or close to the piston (2) Another rod or tube (4), which is larger in diameter than rod or tube (3) is rigidly connected to the other end of piston (2). In the preferred embodiment of the invention rod or tube (4) is a tube with check valve (10) mounted within its length or at its end. In another embodiment, described below, it is a rod or a sealed tube without a check valve. Piston (2) along with part of the rods or tubes (3,4) and the check valves (9,10) are enclosed in cylinder (1), inside of which the piston (2) can slide freely. Cylinder (1), which can be any length, is closed at both ends except to allow the passage of rods or tubes (3,4) and has a buoyant collar (13) attached to one end. Each closed end of the cylinder is fitted with a seal (7,8) which can be any type of seal including the preferred controlled clearance type. Piston (2) divides this cylinder (1) into two pumping chambers (10 and 18). Ports or openings (11 and 12) allow passage of fluid between these chambers via the hollow piston and check valve (9). The end of cylinder (1) adjacent to rod or tube (3) has an opening or port connected to the discharge pipe (5). Discharge pipe (5) may be all flexible pipe or part rigid and part flexible. The other end of discharge pipe (5) may be either connected directly to the shore or in the preferred embodiment will be connected to the mechanism which connects or disconnects the pump from its foundation on the sea bed. This mechanism will be described later in this text. In the preferred embodiment, the discharge pipe (21) is connected to a three way service valve (29) which is remotely operable from the sea surface. A pressure accumulator (30) is connected to the discharge pipe or pipes (21) at some point along its length. Support structure (17) is rigidly connected to cylinder (1) at one end and to the flexible joint (16) at its other end. This support structure (17) may be open to the sea or may include a filter or screen attached to its surface. In another embodiment it may be a cylinder closed at its ends with an inlet port (6). This inlet port may be connected to any source of fluid or may be open to the sea or may be connected to any type of filtration or pretreatment equipment.

Operation of Pump

To better explain the means of operation of this invention, I will start by assuming that the float (14) is static, the accumulator (30) is pressurized above the ambient pressure of the environment of pump, the accumulator(30) is charged with fluid and the pump is full of fluid. In this condition check valve (10) is closed and pumping chamber (19) is pressurized by the accumulator (30). Pumping chamber (18) is also equally pressurized via the piston (2). An axial force is generated on rod or tube (3) by the pressure difference between its ends. A similar, but opposite, axial force is generated on rod or tube (4) by the pressure difference between its ends. Rod or tube, (4) is larger in diameter than rod or tube (3) and hence the magnitude of the force on rod or tube (4) is greater. The resultant of these forces is a net downward force on the operably connected float (14). This force will be balanced by a portion of the buoyancy of float (14) to keep the system in equilibrium. By this means the whole pump string, from float to foundation, is maintained in tension. If now we assume that a rising wave acts upon the float (14) an upward force will be generated by both the kinetic energy of the rising water and by the increasing buoyancy of the float. This force will overcome the above mentioned downward force and the float (14) along with the operably connected piston (2) will move relative to the cylinder (1) causing volume reduction of pumping chamber (19), closing of check valve (9) and hence displacement of fluid into the discharge line (5). Simultaneously, pumping chamber (18) will increase in volume causing fluid to enter it via check valve (10) and port (11). When the float has reached the top of the wave and the wave then begins to descend check valve (9) opens, check valve (10) closes, and the above mentioned force due to the difference in diameter of rods or tubes (3 and 4) will cause the piston (2) to move, relative to the cylinder (1), in an opposite direction to the first stroke therefore causing pumping chamber (19) to expand and pumping chamber (18) to contract. Fluid will therefore pass through the hollow piston via port (11), check valve (9) and port (12) from pumping chamber (18) to pumping chamber (19). The pump is thus reset and ready for the next pumping stroke caused by the next rising wave. The piston (2) may be at any position within the length of cylinder (1) when this next pumping stroke commences or finishes. By this means the pump will self adjust for any variation in water depth caused by, for example, tides. The three way service valve (29) is used for isolating the device from the rest of the discharge pipe or pipes (21) so that it may be retrieved for servicing or repair.

Figure 2:
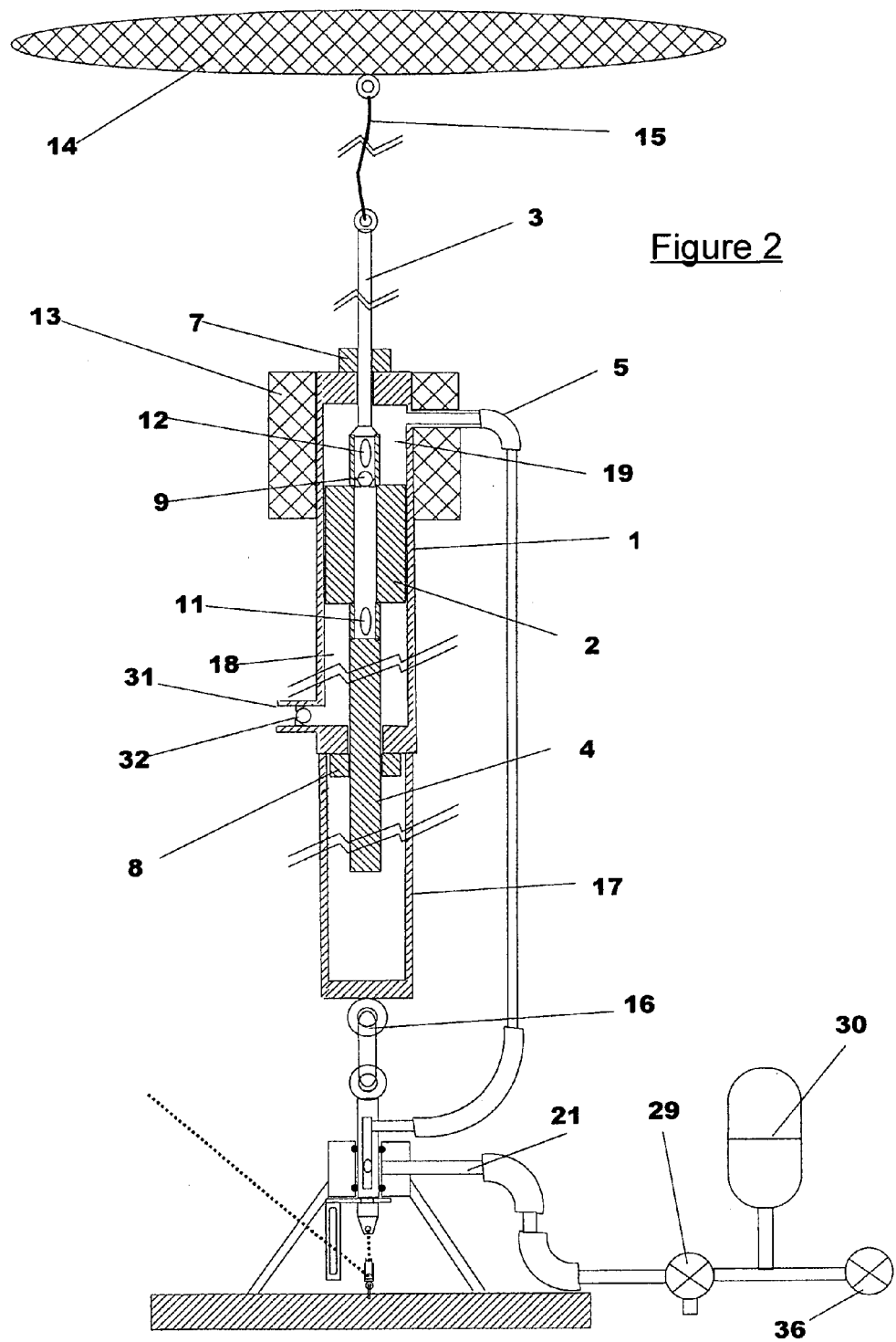
FIG. 2 is a drawing of another embodiment of the pump of the present invention.

I now refer to FIG. 2

Description of Pump

This figure shows another embodiment of the device which differs in the position of the inlet and the check valve. The description is the same as the description of the embodiment in FIG. 1 except for the following changes. In this embodiment the inlet port (31) is located at the opposite end of cylinder (1) from the discharge pipe (5). The inlet check valve (32) is located within or adjacent to this port. Rod or tube (4) is a rod or a sealed tube without a check valve. Port (31) may be connected to any source of fluid or may be open to the sea or may be connected to any type of filtration or pretreatment equipment.

Operation of Pump

The operation of the pump is the same as the embodiment in FIG. 1 except that the incoming fluid now passes through port (31) and check valve (32) directly into pumping chamber (18).

Other Configurations

Either of the above mentioned embodiments may be configured with the pump in an inverted position with the float operably connected to the cylinder and the piston operably connected to the sea bed. That is rod or tube (3) could be connected to flexible joint (16) and cylinder (1) could be connected to flexible rope or chain or rod or tube (15). The construction and operation of the pump would be essentially the same as described above.

Figure 3:
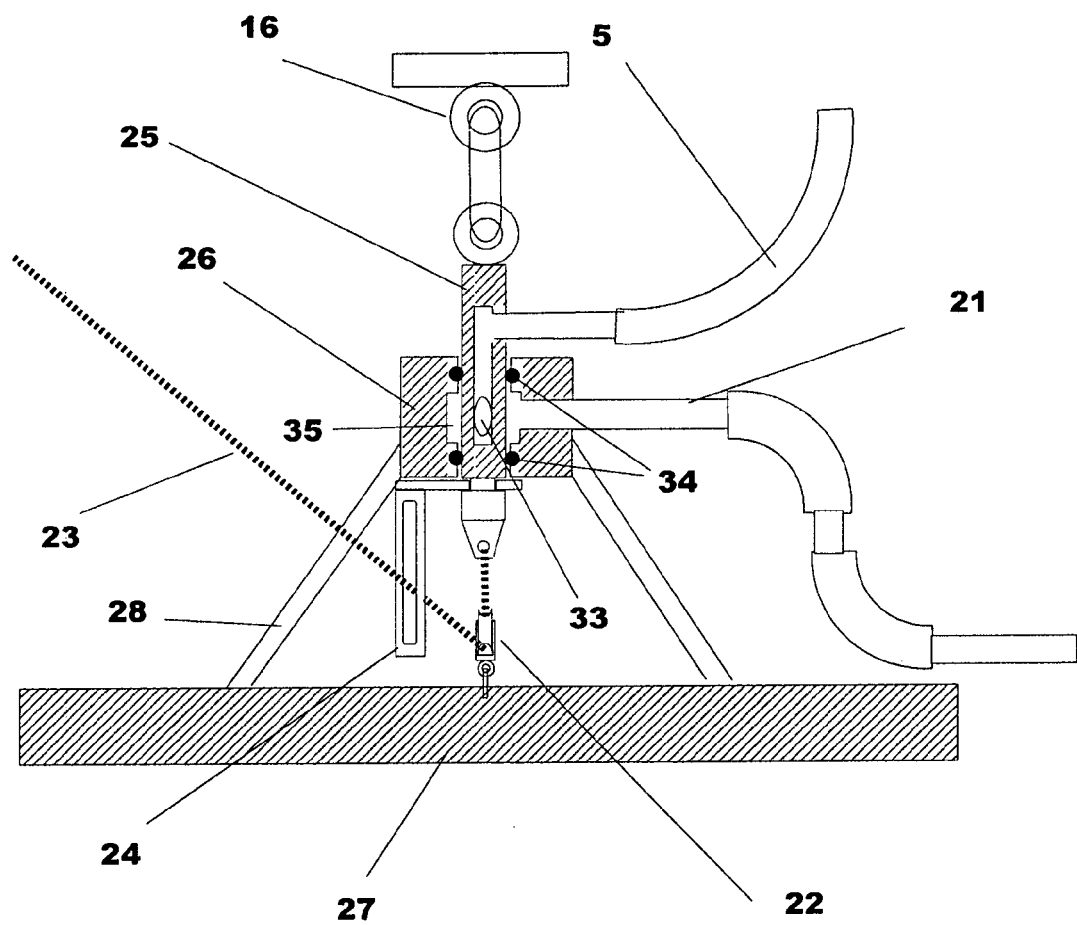
FIG. 3 is an enlarged drawing of one embodiment of the mechanism which connects or disconnects the pump to its foundation on the sea bed Referring first to FIG. 1, I will now describe the pump and its operation in detail.

I now refer to FIG. 3

Description of the Mechanism which Attaches the Pump to the Sea Bed

FIG. 3 shows the mechanism which may connect or disconnect the pump from the foundation.

Flexible joint (16) which can be a toggle, clevis, chain, rope, link or any type of flexible member connects the pump assembly to this mechanism. The other end of flexible joint (16) is rigidly connected one end of pin (25). Pin (25) is hollow through part of its length. Discharge pipe (5) is connected to pin (25) so as to communicate with its hollow part. A port (33), located further along the pin, communicates with the hollow part and also with the outside of the pin. The other end of pin (25) has a groove and is is tapered and connected to the actuation line (23) which can be a rope or tether or cable or chain which extends via pulley (22) and via the fairlead on lock (24) to and beyond the surface of the sea. The receptacle (26) accommodates this pin (25) and is fitted with two seals (34). Between the seals (34) is an annular groove in the receptacle (35) which communicates with the discharge pipe (21). The lock (24) rotates horizontally about a pivot and is shaped to engage the groove on pin (25). Incorporated in the lock (24) is a fairlead. The receptacle (26) is rigidly attached to the foundation (27) by a support structure (28).

FIG. 3 also shows the foundation (27) which can be a gravity foundation constructed from concrete, metal or any other dense material. Foundation (27) may also be an anchor of any kind including screws, piles and plates which are installed below the sea bed.

Operation of the Mechanism which Attaches the Pump to the Sea Bed

The foundation and mechanism shown in FIG. 3 is mounted on the sea bed with a known orientation. To deploy the pump, the upper end of actuation line (23) is connected to a motor boat or other vessel. The motor boat applies tension to the actuation line (23) thus drawing pin (25) and hence the operably attached pump down to and into the receptacle (26). The motor boat, still maintaining tension on the actuation line (23), navigates in an arc around the device. This motion of the motor boat causes the actuation line (23) to bear against the fairlead portion of the lock (24) thereby causing it to rotate about its pivot and engage the groove in pin (25). The actuation line (23) is now disconnected from the motor boat and is attached to any object at the surface ready for later retrieval. Retrieval of the device is carried out in the same manner, except that the motor boat navigates an arc in a reverse direction to that which was used to deploy the device, causing the lock (24) to disengage from the groove in pin (25) thus releasing the device from the receptacle (26). The buoyant collar FIG. 1 (13) causes the disconnected pump to rise to the surface.

Operation of the Pump or Pumps During Storms

At some point along the discharge pipe or pipes (21), but beyond the pressure accumulator (30), a valve or valves (36) may be fitted. This valve or valves (36) may be closed to prevent fluid flow out of the discharge pipe (5) of the pump hence preventing movement of the piston (2) on its pumping stroke. Pressurized fluid from the accumulator will continue to activate the return stroke therefore causing the float (14), which is operably connected to the piston (2), to descend to the level of the lowest wave trough. As the wave rises the float will submerge below it and by this means protect itself from damage from the large forces which would be generated in the crest of a storm induced wave. Resilient stops may also be fitted within the cylinder (1) or attached to the ends of piston (2) to restrict the motion of the piston and hence the operably connected float.

The invention claimed is:

1. A float operated reciprocating pump for generating energy from the motion of waves in a body of water, said float operated reciprocating pump comprising:
   a float;
   a closed cylinder connected to one of said float and a seabed, said closed cylinder having a fluid inlet and a fluid discharge;
   a piston disposed within said cylinder and moveable longitudinally therein, said piston having a passage extending longitudinally therethrough;
   a fluid check valve disposed to communicate with said passage through said piston;
   a first rod connected to said piston and extending through one end of said closed cylinder and further connected to other of one of said float and said seabed; and
   a second rod having a larger diameter than a diameter of said first rod, said second rod extending through an other end of said closed cylinder;
   wherein said first rod and said second rod are coaxially extending.

2. The float operated reciprocating pump according to claim 1, wherein said fluid inlet of said cylinder is provided with a check valve mounted to communicate between an exterior and interior of said cylinder.

3. The float operated reciprocating pump according to claim 2, wherein said check valve is in a position adjacent to or within said cylinder end through which said second rod passes.

4. The float operated reciprocating pump according to claim 1, wherein said second rod is a tube and said inlet of said cylinder comprises a check valve mounted to communicate with an interior of said tube, wherein said interior of said tube also communicates with said cylinder via a port in a wall of said tube.

5. The float operated reciprocating pump according to claim 4, wherein said port is positioned adjacent to a connection of said tube with said piston.

6. The float operated reciprocating pump according to claim 5, wherein a connection of said float to the sea bed comprises a closed hollow pin one end of which is flexibly connected to said float operated reciprocating pump, and an other end of said pin is connected to one end of a rope.

7. The float operated reciprocating pump according to claim 6, wherein said rope being threaded through a receptacle receiving said pin, said rope thence being threaded through a pulley, and said rope thence being threaded through a fairlead.

8. The float operated reciprocating pump according to claim 7, wherein an other end of said rope extending to a water surface, said pulley being operably connected to the sea bed, said receptacle being connected to the sea bed, said fairlead being connected to a lock operably connected to said receptacle, said lock being arranged so as to engage or disengage a groove defined in said pin.

9. The float operated reciprocating pump according to claim 8, wherein a hollow portion of said pin being connected to and communicating with a discharge pipe of said float operated reciprocating pump, said pin having a port between said hollow portion and an exterior of said pin, said receptacle having passageways within to communicate with said port in said pin, said passageways connected to and communicating with a further discharge pipe.

10. The float operated reciprocating pump according to claim 2, further comprising a pressure accumulator connected to and in communication with a discharge pipe.

11. The float operated reciprocating pump according to claim 2, wherein said closed cylinder further comprising a buoyant collar attached to one of said ends of said closed cylinder.

12. A float operated reciprocating pump comprising:
   a float;
   a closed cylinder connected to said float and a seabed, said closed cylinder having a fluid inlet and a fluid discharge;
   a piston disposed within said cylinder and moveable longitudinally therein, said piston having a passage extending longitudinally therethrough;
   a fluid check valve disposed to communicate with said passage through said piston;
   a first rod connected to said piston and extending through one end of said closed cylinder and further connected to other of one of said float and said seabed;
   a second rod having a larger diameter than a diameter of said first rod, said second rod extending through an other end of said closed cylinder;
   wherein said first rod and second rod are coaxially extending;
   a closed hollow pin one end of which is flexibly connected to said float operated reciprocating pump, and an other end of said pin is connected to one end of a rope.

13. The float operated reciprocating pump according to claim 12, wherein said fluid inlet of said cylinder is provided with a check valve mounted to communicate between an exterior and interior of said cylinder.

14. The float operated reciprocating pump according to claim 13, wherein said check valve is in a position adjacent to or within said cylinder end through which said second rod passes.

15. The float operated reciprocating pump according to claim 12, wherein said second rod is a tube and said inlet of said cylinder comprises a check valve mounted to communicate with an interior of said tube, wherein said interior of said tube also communicates with said cylinder via a port in a wall of said tube, and wherein said port is positioned adjacent to a connection of said tube with said piston.

16. The float operated reciprocating pump according to claim 15, wherein said rope being threaded through a receptacle receiving said pin, said rope thence being threaded through a pulley, and said rope thence being threaded through a fairlead.

17. The float operated reciprocating pump according to claim 16, wherein an other end of said rope extending to a water surface, said pulley being operably connected to the sea bed, said receptacle being connected to the sea bed, said fairlead being connected to a lock operably connected to said receptacle, said lock being arranged so as to engage or disengage a groove defined in said pin.

18. The float operated reciprocating pump according to claim 17, wherein a hollow portion of said pin being connected to and communicating with a discharge pipe of said float operated reciprocating pump, said pin having a port between said hollow portion and an exterior of said pin, said receptacle having passageways within to communicate with said port in said pin, said passageways connected to and communicating with a further discharge pipe.

19. The float operated reciprocating pump according to claim 12, further comprising a pressure accumulator connected to and in communication with a discharge pipe which is in communication with a hollow portion of said pin.

20. The float operated reciprocating pump according to claim 12, wherein said closed cylinder further comprising a buoyant collar attached to one of said ends of said closed cylinder.

\* \* \* \* \*